United States Patent [19]
Miles et al.

[11] Patent Number: 5,731,546
[45] Date of Patent: Mar. 24, 1998

[54] TELECOMMUNICATIONS CABLE MANAGEMENT TRAY WITH A ROW OF ARCUATE CABLE GUIDE WALLS

[75] Inventors: Scott B. Miles, Ashby; Steven J. Starsja, Princeton, both of Mass.

[73] Assignee: Molex Incorporated, Lisle, Ill.

[21] Appl. No.: 616,391

[22] Filed: Mar. 15, 1996

[51] Int. Cl.$^6$ ..................................... H01B 2/00
[52] U.S. Cl. ................ 174/135; 439/449; 439/456; 361/826
[58] Field of Search ............... 174/60, 135, 72 A, 174/72 R; 489/719; 361/826, 827, 828; D13/155, 154; 248/49; 439/DIG. 942, 456, 460, 449; D8/356, 357

[56] References Cited

U.S. PATENT DOCUMENTS

| | | | |
|---|---|---|---|
| 4,099,822 | 7/1978 | Carlisle et al. | 439/405 |
| 4,236,778 | 12/1980 | Hughes et al. | 439/409 |
| 4,752,107 | 6/1988 | Gunell et al. | 439/709 |
| 4,845,316 | 7/1989 | Kaercher | 174/135 |

FOREIGN PATENT DOCUMENTS

| | | | |
|---|---|---|---|
| 193196 | 9/1986 | European Pat. Off. | 439/449 |
| 2459247 A | 6/1976 | Germany | 361/826 |
| 4323370 A1 | 1/1995 | Germany | 174/135 |

OTHER PUBLICATIONS

IBM Technical Disclosure, vol. 21, No. 2, Frisbie et al., p. 509, Jul. 1978.
IBM Technical Disclosure, vol. 8, No. 5, Foytlin, p. 722, Oct. 1965.

*Primary Examiner*—Khistine L. Kincaid
*Assistant Examiner*—Kamand Cuneo
*Attorney, Agent, or Firm*—A. A. Tirva

[57] ABSTRACT

A cable management apparatus includes a tray having a pair of arms for connections to a communications assembly and a body having a plurality of cable channels defined by arcuate guide walls. The channels have a relatively narrow exit and a relatively wide entrance and the curvature of the walls is chosen not to exceed a predetermined maximum cable bend radius. Further guides are arranged in the channel entrances as extensions of adjacent channel side walls.

13 Claims, 2 Drawing Sheets

5,731,546

TELECOMMUNICATIONS CABLE MANAGEMENT TRAY WITH A ROW OF ARCUATE CABLE GUIDE WALLS

FIELD OF THE INVENTION

This invention relates to management of cabling and in particular to the management of data and voice communications cabling which is terminated to patch panels, racks and the like. The invention is particularly concerned with cable bend radius management.

BACKGROUND OF THE INVENTION

In the telecommunications industry it is commonplace for large numbers of connectors to be loose at a single location, for example on a patch panel. Typically large numbers of cables will be connected to the connectors. It is desirable for the cables to be arranged neatly and tidily at the rear of the panel firstly to make removal of a single given cable easy and secondly to avoid an unsightly mess of cable. It is also important that the mass of the cable does not cause the cable connections to the connectors to become overstrained. To that end it is known to provide a bar or tray across the back of the patch panel which allows cable ties to be inserted. These arrangements allow strain relief for the cables to be provided.

We have understood that there exists a further problem with cabling high data rate or higher speed signals. To transport high data rate signals over UTP (Unshielded Twisted Pair) cable the installer must avoid exceeding a bend radius requirement and avoid over cinching the cable. Over bending or over cinching may cause a variety of physical problems such as cracked insulation, extruded wire or insulation, or broken wires, each of which may cause changes in the attenuation and cross talk characteristics of the media. TIA (Telecommunications Industry Association) regulations dictate that the smallest bend radius allowable for a UTP cable is 4 times the cable diameter.

OBJECTS OF THE INVENTION

It is an object of the invention to provide a cable management arrangement which overcomes or alleviates the disadvantages discussed above.

It is a further object of the invention to provide a cable management arrangement which manages the bend radius of cables.

It is a still further object of the invention to provide a cable management arrangement which prevents over cinching of cables.

SUMMARY OF THE INVENTION

The invention provides a cable management tray with a plurality of cable channels. The channels have a relatively wide entrance and a relatively narrow exit. The walls of the channel are arcuate and are chosen not to exceed the maximum permissible bend radius of the cable. The walls are symmetrical about the channel axis so that cable can be inserted from either side of the tray. Further guides are arranged in the entrance of the channels and function as continuations of adjacent guide walls.

By virtue of the curvature of the walls of the guide channels, cables fed into the tray cannot exceed their maximum bend radius and so become damaged. Apertures for cable ties are provided. The cable ties are preferably made to include a hook and loop fastener. A mounting means is provided for connection of the tray to a communications assembly. The mounting means includes a pair of arms which, when in position, define an area between the tray and the assembly through which cables may be fed.

DETAILED DESCRIPTION

Figure 1:
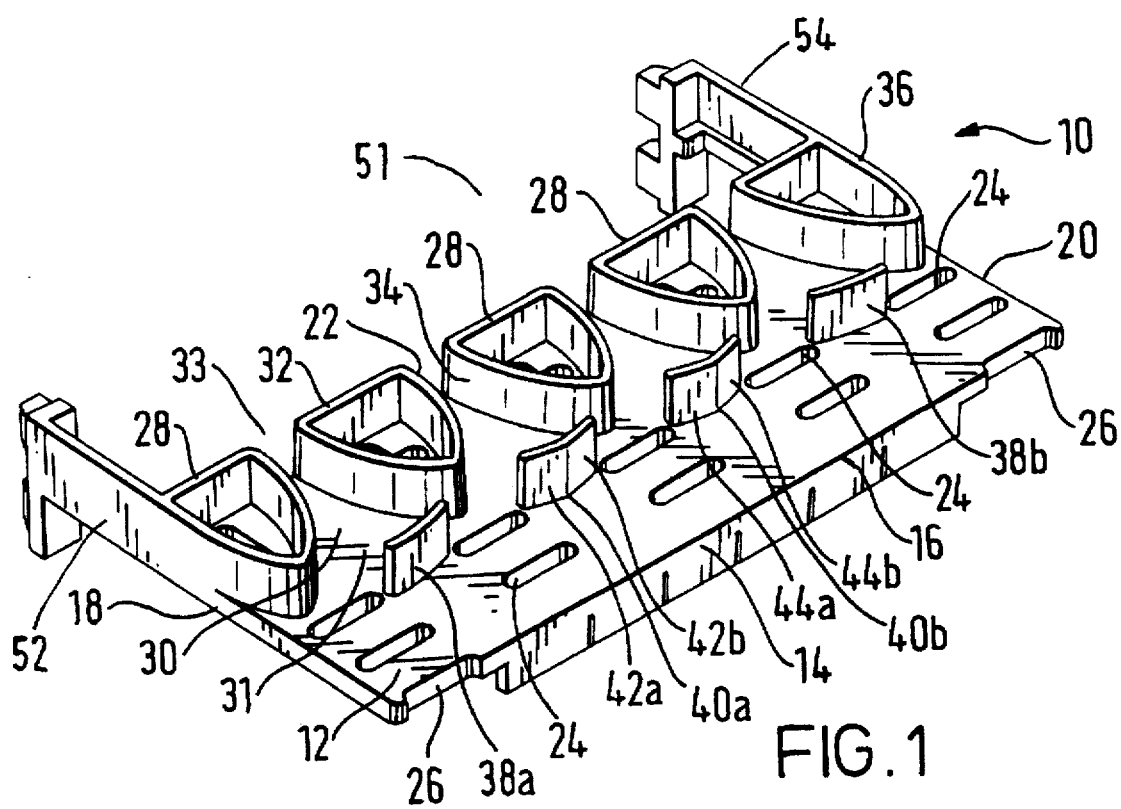
FIG. 1 is a perspective view of a cable management tray embodying the invention.

FIG. 1 illustrates a cable management tray generally indicated by the reference numeral 10. The tray comprises a generally rectangular base 12 having a dependent flange 14 at its front edge 16. The base has opposed sides 18, 20, the front edge 16 and a rear edge 22. Arranged towards the front edge in two parallel rows, themselves parallel to front edge 16 is a series of elongate apertures 24 which are each long enough to receive a tie wrap. In example illustrated there are two rows of five elongate apertures, a total of ten, although the number may be varied as circumstances dictate.

The front edge 16 also has a pair of recesses 26, one at each end of approximately the same length as the elongate apertures 24. The recesses 26 are also provided for receiving cable ties.

Figure 2:
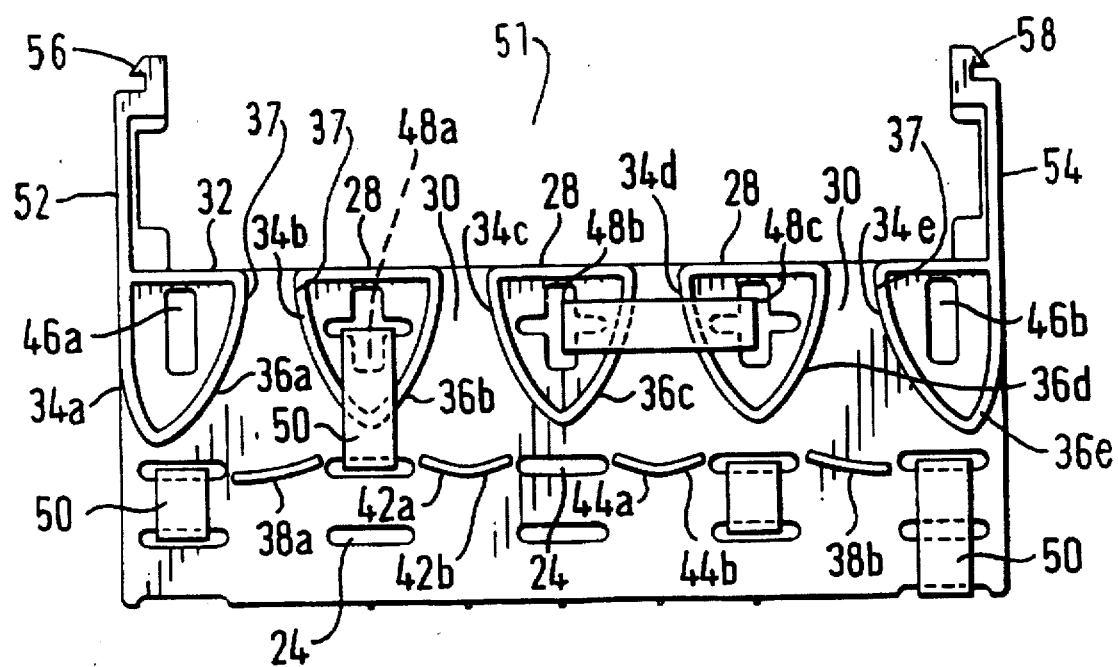
FIG. 2 is a plan of the tray of FIG. 1.

At the rear of the base is a series of five cable guides 28 which define four cable channels 30. Each cable guide comprises a set of three raised walls 32, 34 and 36 having a generally triangular plan with a pair of equal but oppositely curved sides as can be seen from FIG. 3. Whilst the rear wall 32 is not strictly necessary, other than to give strength, the side walls 34 and 36 are shaped to follow the desired bend of the cable to be inserted into the cable channel. Thus, in order to meet TIA regulations the side walls of the cable guide are shaped to prevent the incoming cable from having a bend radius of not less than four times the largest four pair UTP cable diameter. It will be seen from FIG. 2 that the walls 34 and 36 are only partially curved along their length, a portion 37 of each towards the rear edge of the base being straight. The length of the curve is not important provided that the bend management radius requirements mentioned previously are met. Similarly the geometric curved used, such as a circular or parabolic curve is not important provided that the bend management requirements are met at all points along the curve.

It will be seen that each channel 30 has a relatively wide mouth or entrance 31 for cables and a relatively narrow exit 33. At the mouth of each cable channel 30 is arranged a further guide wall. The outer channels have a guide wall 38a, b which is a shaped arcuate wall arranged between the two adjacent elongate apertures 24 at the end of the row furthest from the font edge. The wall 38 is angled such that its front face is approximately level with the front edge of the side aperture and level with the rear edge of the inner aperture. The arc of the end walls is chosen to be continuation of the curve of the wall of the adjacent cable channel formed by the adjacent cable guide. Thus the guide wall 38a is an extension of the arc of cable guide wall 36b.

The inner cable channels each have guide walls 40a, b which are formed of two opposed arcuate portions 42a, b and 44a, b. Again, the arc of each portion is chosen to be a continuation of the curve of the side of the adjacent cable channel. Thus portion 42a is shaped to follow the curve of side walls 34b, portion 44a is shaped to follow the curve of side wall 34c and so on.

It is to be understood that the actual curvature of the side walls of the guides and of the further guides is unimportant provided that the cable fed through the guide channels cannot exceed the permitted bend radius.

The walls 32, 34, 36 of the cable guides define an interior space in which is provided further elongate slots 46a, b and 48a, b and c for cable ties. Generally the slots extend in a direction which allows cable ties to be arranged across cables. Examples of how cable ties may extend are shown in shaded bands 50 in FIG. 2. It will be noted that the slots in the three center cable guides are cruciform whereas the endmost guides have an elongate slot parallel to the sides 18, 20 of the tray. This difference is purely due to space requirements and other arrangements may be adopted.

A pair of arms 52, 54 extend from the rear of the tray at the sides as extensions of the outermost side walls 34a, 36e of the outermost cable guides 28 and also as an extension of the base. At their free ends the arms 52, 54 have mounts 56, 58 for attachment to a patch panel, a frame or the like. An example of a suitable mount is a pair of snap beads which engage in corresponding slots in the mounting surface. The arms 52, 54 define a space 51 between them for receiving cabling when the tray is mounted in position.

Figure 3:
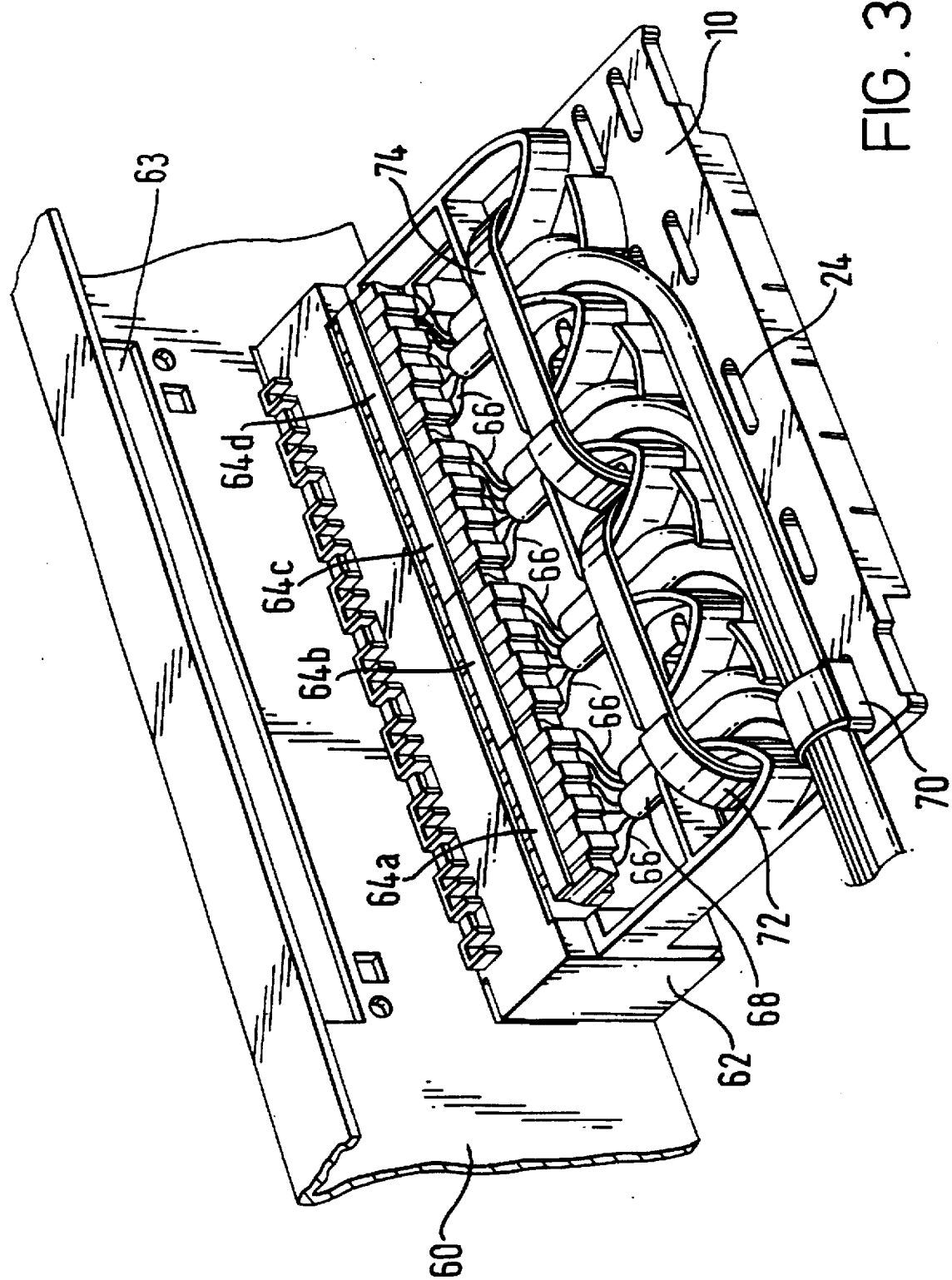
FIG. 3 is a perspective view of the tray of FIG. 1 mounted on a patch panel and with cable arranged thereon.

FIG. 3 shows the cable management tray mounted at the rear of a patch panel 60. Blocks of telecommunications connectors are mounted on the patch panel 60 and one such block 62 is shown in FIG. 3. An aperture 63 is provided for a further block, and a typical panel would include up to six blocks arranged in two rows of three. From the rear of the connector block 62 extend two row of four insulation displacement connectors 64. In the figure only the top row 64 a to d is visible, a similar row is arranged beneath the cable tray. An example of a suitable connector is the KATT (TM) connector sold by Mod-Tap corporation of Harvard, Mass. Each insulation displacement connector has eight insulation displacement contacts (not shown) to each of which is terminated an insulation wire 66 of a cable 68. Thus in the connector block shown, there are terminated 64 wires from eight separate cables. The incoming cables are arranged such that two cables are fed through each cable channel 30. Preferably the cables in a given channel are terminated to the insulation displacement connectors immediately above and below that channel. Thus, in the figure, the two cables in the left end cable channel are terminated to the leftmost upper and lower insulation displacement connectors.

It can also be seen in FIG. 3 that the cable is introduced into the tray from the left hand side of the tray and is guided along the left hand side walls 36 of the cable guides and the right hand portions of the further cable guides. As all the guides are symmetrical cable can be introduced from either side of the tray. However, it will be appreciated that an alternative embodiment having only guides for cable inserted from one side could be produced.

Also shown in FIG. 3 are three examples of cable ties 70, 72, and 74 in place. A suitable material for the cable ties is a hook and eye fastener such as Velcro (RTM). In the figure a first cable tie 70 extends around the cables at their entry point onto the tray, the ties being fed through the end most elongate apertures of each of the parallel rows 24 on the entry side. The other ties are each looped through the elongate aperture in the endmost cable guide and through the cruciform aperture in the central cable guide. It will be noted that the apertures are of sufficient width to receive two cable ties.

The invention as described has the advantage that the bend radius of cables attached to a patch panel or similar apparatus may be manage simply by attachment of the management tray. In this manner the danger of damage to the cable with the consequent risk of loss of performance is minimized.

Various modifications to the embodiment described are possible without departing from the spirit and scope of the invention. For example, the number of cable guides per tray may vary. This is simply a matter of convenience and should be chosen in accordance with the length of block 62. Whilst it is preferred that the tray be made from a clear plastics material as this allows illumination of the terminations below the tray this is not essential and other materials, not necessarily clear, may be used.

The tray has been described as a base having guides defined by upstanding walls. Alternatively the features could be defined by depressed channels formed to depend from the base. Such an arrangement is effectively the negative image of the structure described and equally effective.

In each cable guide described there is a pair of equally curved, opposed side walls. It will be understood that only one of these walls need be curved if cable is only introduced from one side of the tray.

What is claimed is:

1. A cable management apparatus for a communications assembly having a plurality of communications connectors each having cables connected thereto, the apparatus comprising:
   a cable tray; and
   a plurality of guide walls on the tray, each of said guide walls defining a guide channel having a relatively wide entrance for cables and a relatively narrow exit for cables to said communications assembly, each of the guide walls being arcuate and having a radius of curvature not less than a predetermined permissible bend radius.

2. A cable management apparatus according to claim 1, wherein each of said guide channels is defined by a pair of said arcuate guide walls having an equal and opposite curvature.

3. A cable management apparatus according to claim 1, wherein a further cable guide is arranged in the relatively wide entrance of each said channel.

4. A cable management apparatus according to claim 3, wherein the further cable guide is arcuate and formed along the path of an extension of the curvature of a side wall of an adjacent one of said guide channels.

5. A cable management apparatus according to claim 1, wherein the curvature of the side wall is chosen such that is not less than four times the maximum diameter of a cable held between said guide walls.

6. A cable management apparatus according to claim 1, comprising a plurality of apertures in the tray each receiving at least one cable tie.

7. A cable management apparatus according to claim 6 wherein the at least one cable tie includes a hook and loop fastener.

8. A cable management apparatus according to claim 6, wherein the apertures are arranged in two parallel rows.

9. A cable management apparatus according to claim 1, wherein the tray further comprises a pair of mounting arms for mounting the tray to the communications assembly.

10. A cable management apparatus according to claim 1, wherein said each of said guide walls is one of a pair of said guide walls, said guide channel being defined between said pair of said guided walls.

11. A cable management apparatus according to claim 10, wherein both walls of said pair of said guide walls are arcuate and have a radius of curvature not less than a predetermined permissible bend radius.

12. A cable management apparatus according to claim 4, wherein at least one of the further cable guides comprises two arcuate portions having equal but opposed curvatures whereby one of said two arcuate portions is formed along the path of an extension of a sidewall of an adjacent one of said guide channels and the other of said two arcuate portions is formed along the path of an extension of a sidewall of another adjacent one of said guide channels.

13. A cable management apparatus for a communications assembly having a plurality of communications connectors each having cables connected thereto, the apparatus comprising:

a cable tray; and a plurality of pair of guide walls on the tray, each said pair defining a guide channel having a relatively wide entrance for cables and a relatively narrow exit for cables to said communications assembly, at least one of the guide walls of each said pair being arcuate and having a radius of curvature not less than a predetermined permissible bend radius, wherein, the guide channels are arranged in a line, whereby each of said guide channels has at least one adjacent one of said guide channels; and a plurality of further cable guides arranged at the guide channels entrances, each of said guide channels having a respective one of said further cable guides arranged at the entrance to an adjacent one of said guide channels.

* * * * *